(12) United States Patent
Dargahi et al.

(10) Patent No.: US 11,507,734 B2
(45) Date of Patent: *Nov. 22, 2022

(54) SYSTEM AND METHOD FOR EMBEDDING, EDITING, SAVING AND RESTORING OBJECTS WITHIN A BROWSER WINDOW

(71) Applicant: VMware, Inc., Palo Alto, CA (US)

(72) Inventors: Ross Dargahi, Mountain View, CA (US); Kevin M. Henrikson, San Mateo, CA (US); Jong Yoon Lee, San Ramon, CA (US); James Andrew Clark, San Jose, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/023,712

(22) Filed: Jun. 29, 2018

(65) Prior Publication Data

US 2018/0307663 A1 Oct. 25, 2018

Related U.S. Application Data

(63) Continuation of application No. 13/937,929, filed on Jul. 9, 2013, now Pat. No. 10,013,405, which is a continuation of application No. 11/705,843, filed on Feb. 14, 2007, now Pat. No. 8,930,812.

(60) Provisional application No. 60/774,384, filed on Feb. 17, 2006.

(51) Int. Cl.
*G06F 40/166* (2020.01)
*G06F 16/95* (2019.01)

(52) U.S. Cl.
CPC .......... *G06F 40/166* (2020.01); *G06F 16/95* (2019.01)

(58) Field of Classification Search
CPC ......... G06F 17/24; G06F 40/166; G06F 16/95
USPC ....................................................... 715/255
See application file for complete search history.

(56) References Cited

U.S. PATENT DOCUMENTS

| | | |
|---|---|---|
| 5,995,756 A | 11/1999 | Herrmann |
| 7,676,481 B2 * | 3/2010 | Kathuria ............... G06F 9/4493 |
| | | 707/999.101 |
| 8,370,732 B2 | 2/2013 | Black |
| 8,930,812 B2 | 1/2015 | Dargahi et al. |
| 10,013,405 B2 | 7/2018 | Dargahi et al. |

(Continued)

*Primary Examiner* — Kavita Stanley
*Assistant Examiner* — Tionna M Burke
(74) *Attorney, Agent, or Firm* — Fish & Richardson P.C.

(57) ABSTRACT

In accordance with one embodiment, the present invention provides the ability to embed and edit rich content into a browser document. Embedded objects are not backed by installed desktop applications. Instead, in one embodiment, the embedded objects are Asynchronous Javascript and XML (AJAX) components that adhere to a set of design patterns, which are embedded within editable HTML documents. For example, a user composing an email message can embed a spreadsheet into the email in accordance with an embodiment of the present invention. The spreadsheet is implemented, in one embodiment, as an AJAX component adhering to the Ajax Linking and Embedding (ALE) design pattern. Since it is an ALE component, the embedded object is fetched across the network so that it may be instantiated and used regardless of the user's location. The user can edit, manipulate, and save the embedded object while remaining in the context of the container document.

18 Claims, 10 Drawing Sheets

(56) References Cited

U.S. PATENT DOCUMENTS

| | | | |
|---|---|---|---|
| 2004/0006743 A1* | 1/2004 | Oikawa | G06F 17/212 |
| | | | 715/255 |
| 2006/0136553 A1* | 6/2006 | Villaron | G06F 17/24 |
| | | | 709/203 |
| 2006/0259592 A1 | 11/2006 | Angeline | |
| 2007/0094607 A1* | 4/2007 | Morgan | G06F 17/211 |
| | | | 715/762 |
| 2008/0154798 A1 | 6/2008 | Valz | |

* cited by examiner

⊞ Notebook

📄 Sample Notebook Page

This is a sample notebook page

| Customer | Phone Number | Address | | | | | | | |
|---|---|---|---|---|---|---|---|---|---|
| John Smith | 650-555-1212 | 1500 Fashion Island Blvd., San Mateo CA 94404 | | | | | | | |
| Ross Jones | 408-555-1213 | 330 Mariposa Ave., Mountain View CA 94041 | | | | | | | |
| | | | | | | | | | |
| | | | | | | | | | |
| | | | | | | | | | |
| | | | | | | | | | |
| | | | | | | | | | |
| | | | | | | | | | |

— 120 rossd@companyname.com • 2/8/13 11:17 AM

Copyright © 2XXX Company Name, Inc., All rights reserved.    Do not distribute without permission

Figure 1D

| Notebook

Sample Notebook Page    rossd@companyname.com • 2/8/13  11:17 AM

This is a sample notebook page with some modified spreadsheet data —— 115

| Customer | Phone Number | Address | | | | | | | |
|---|---|---|---|---|---|---|---|---|---|
| John Smith | 650-555-1212 | 1500 Fashion Island Blvd., San Mateo CA 94404 | | | | | | | |
| Albert Brown | 281-555-3456 | 11478 Village Place Drive, Houston TX 77077 | | | | | | | |
| | | | | | | | | | |
| | | | | | | | | | |
| | | | | | | | | | |
| | | | | | | | | | |

125  135  145  120

Copyright © 2XXX  Company Name, Inc., All rights reserved.    Do not distribute without permission

| Notebook | | |
|---|---|---|
| Sample Notebook Page | | rossd@companyname.com • 2/8/13  11:17 AM |

This is a sample notebook page

| Customer | Phone Number | Address | | | | | | | |
|---|---|---|---|---|---|---|---|---|---|
| John Smith | 650-555-1212 | 1500 Fashion Island Blvd., San Mateo CA 94404 | | | | | | | |
| Ross Jones | 408-555-1213 | 330 Mariposa Ave., Mountain View CA 94041 | | | | | | | |

135

🔍 Search
👤+ Add to Contacts
💻 Skype Call

170

120

Copyright © 2XXX  Company Name, Inc., All rights reserved.    Do not distribute without permission

SYSTEM AND METHOD FOR EMBEDDING, EDITING, SAVING AND RESTORING OBJECTS WITHIN A BROWSER WINDOW

RELATED APPLICATIONS

This application is a continuation of U.S. patent application Ser. No. 13/937,929, filed Jul. 9, 2013, which is a continuation of U.S. patent application Ser. No. 11/705,843, filed Feb. 14, 2007, which claims the benefit of, and priority under 35 USC § 119(e) to, provisional application No. 60/774,384, which is entitled "System and method for embedding, editing, saving, and restoring objects within an editable browser window" and which was filed on Feb. 17, 2006. These applications are hereby incorporated herein in their entirety.

BACKGROUND OF THE INVENTION

Field of the Invention

This invention relates generally to embedding objects, and more particularly, to embedding, editing, saving and restoring objects within a browser window.

Description of the Related Art

One of the key features of modern word processors like OpenOffice from Sun Microsystems (Santa Clara, Calif.) and Microsoft Word from Microsoft Corp. (Redmond, Wash.) is the ability to embed higher order objects into a document. For example, while editing, it is possible to embed a chart, picture, spreadsheet, or other rich content into the text document. Furthermore, it is possible to edit the embedded content while remaining within the context of the word processing application. In a desktop environment, this is typically accomplished by invoking the host application used by the embedded object (e.g., a spreadsheet application if the embedded object is a spreadsheet). The user experience in such an instance is that the embedded object becomes editable and the functions of the application used by the embedded object become available to the user while he is editing the object. It is possible to embed different documents and/or objects (possibly based on different desktop applications) within one document. For instance, a user can embed a spreadsheet created in Microsoft Excel and a document created in Adobe Acrobat from Adobe (San Jose, Calif.) within a document created using Word from Microsoft. When a user later wishes to edit or modify any of the embedded objects, he simply double-clicks on the embedded object, whereupon the corresponding desktop application (e.g., Microsoft Excel) opens up on the user's computer, and the user can then proceed to edit the embedded object within the application that was used to create it. Any changes made to the object are saved, and are reflected in the container document (in this example, the Microsoft Word document).

This powerful capability has typically been enabled by using a component embedding model such as Microsoft's COM/DCOM or IBM's DSOM and has been strictly within the domain of fat desktop applications and office suites.

The above-discussed functionality is based upon Object Linking and Embedding (OLE) technology. OLE is a distributed object system and protocol developed by Microsoft. OLE takes advantage of and is a part of the larger, more general concept, the Component Object Model (COM) and its distributed version DCOM. OLE allows an editor to send out part of a document to another editor and then reimport it. OLE is based upon a fat client architecture, which means that the file type or the application which is being embedded must be present on the machine which is being operated upon. For instance, if a Microsoft Excel spreadsheet is to be manipulated or even viewed, then there must be a copy of Excel or an Excel viewer installed on the user's machine.

The concept of embedding is also used in the context of multimedia in Web pages, where video, animation (including Flash animations), and audio files are embedded within the hypertext markup language (such as HTML or XHTML) or other structural markup language used (such as XML or SGML). However, in these instances, it is not possible to modify the embedded content while remaining within the context of the container document, and to save the changes, so as to have those changes be seamlessly reflected while remaining within the context of the container document in which the content is embedded.

Thus there is a need for a method and system for embedding objects within a browser window, and for seamlessly editing, saving and restoring objects within the browser window, where the embedded objects are not supported by underlying desktop applications which need to be present on the user's machine.

BRIEF SUMMARY OF THE INVENTION

The various embodiments of this invention provide for embedding objects within a browser window, and for seamlessly editing, saving and restoring such embedded objects within the browser window, where the embedded objects are not supported by underlying desktop applications which need to be present on the user's machine.

A system in accordance with an embodiment of the present invention provides the ability to embed and edit rich content into a browser document. Instead of embedding objects that are backed by installed desktop applications, in one embodiment, the embedded objects are Asynchronous Javascript and XML (AJAX) components that adhere to a key set of design patterns, and which are embedded within editable HTML documents. For example, if a user is composing an email message, he can embed a spreadsheet into the email in accordance with an embodiment of the present invention. The spreadsheet is implemented, in one embodiment, as an AJAX component adhering to the Ajax Linking and Embedding (ALE) design pattern. Since it is an ALE component, the spreadsheet is fetched across the network so that it may be instantiated and used regardless of the user's location.

Examples of applications that can be integrated include spreadsheets, contact managers, calendars, drawings, videos, workflows, presentations, and so on. In accordance with an embodiment of the present invention, objects and/or documents can be embedded within a container document. Examples of the container document include emails, memos, calendar entries, contact notes, notebook pages in a notebook application, and so on. Examples of embedded objects include spreadsheets, calendar entries, workflows, videos, still images, and so on.

In accordance with an embodiment of the present invention, when a user initiates the creation of an embedded object, a shell such as an IFrame is created at the location of the cursor within the container document. Code specific to the application being used to create the embedded object is then loaded from an appropriate location. The location is specified, in one embodiment, by a URL. When the code is loaded, it registers some methods with the IFrame.

Examples of such methods include serialization and deserialization methods. An instance of the object to be embedded is created at the cursor location, and the user can proceed to add data into the object. When the user saves the document, the entered data is saved appropriately using one of the registered methods (e.g., serialization). In one embodiment, the embedded object is then rendered to the user in a read-only format.

In one embodiment of the present invention, the saved container document as well as the embedded document can be accessed and modified at a later time. When the user initiates this editing, the appropriate code is again downloaded from the appropriate location. In one embodiment, the code does not need be downloaded again, since it is cached in the browser's cache. The instance of an object is once again created at the previously created location. Further, the previously saved data is obtained using one of the registered methods (e.g., deserialization), and this data is populated into the instance of the object. The user can modify and again save this data.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

FIG. 1D is a screen shot which shows the spreadsheet in a read-only mode in accordance with an embodiment of the present invention.

FIG. 1E is a screen shot which shows modified data in accordance with an embodiment of the present invention.

FIG. 1G is a screen shot which shows a zimlet context menu working with data in a cell in the spreadsheet in accordance with an embodiment of the present invention.

DETAILED DESCRIPTION OF THE INVENTION

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein. Moreover, some examples are described with respect to the Zimbra Collaboration Suite from Zimbra Inc. (San Mateo, Calif.) who is the assignee of this patent application, but the invention is in no way limited to the Zimbra Collaboration Suite.

Various embodiments of the present invention may be used in the context of email applications and/or collaboration suites, such as the Zimbra Collaboration Suite from Zimbra, Inc. (San Mateo, Calif.), Microsoft Exchange and Microsoft Outlook from Microsoft Corp. (Redmond, Wash.), and Lotus Notes from IBM (Armonk, N.Y.), and those from Yahoo (Sunnyvale, Calif.), and Google (Mountain View, Calif.). Objects can be embedded, manipulated, saved and stored within email messages, contacts, calendar appointments, etc. in accordance with various embodiments of the present invention. Another example of a context in which various embodiments of the present invention can be used is a wiki, a website that allows the visitors themselves to easily add, remove, and otherwise edit and change available content, typically without the need for registration. It is to be noted that the above are just examples, and that the present invention is not limited to these contexts.

In accordance with an embodiment of the present invention, AJAX Linking and Embedding (ALE) technology provides the ability to embed rich content into an editable document and to then interact with and edit that content in a seamless manner. The embedded objects do not use installed desktop applications (e.g. a spreadsheet or drawing application). Instead, in one embodiment, the embedded objects are AJAX components that are embedded into an editable HTML document. These components adhere to a set of design patterns specified by the ALE specification.

For example, if a user is editing some content such as a personal note or an email message, then she would be able to directly embed an AJAX spreadsheet into the note or email body and interact with the spreadsheet while remaining in the editing context of the note or email message. As long as the spreadsheet component adheres to the ALE specification it can be fetched across the network, instantiated, and used, regardless of the user's location. One such example is shown in FIG. 1-G.

EXAMPLE OF FUNCTIONALITY

Figure 1A:
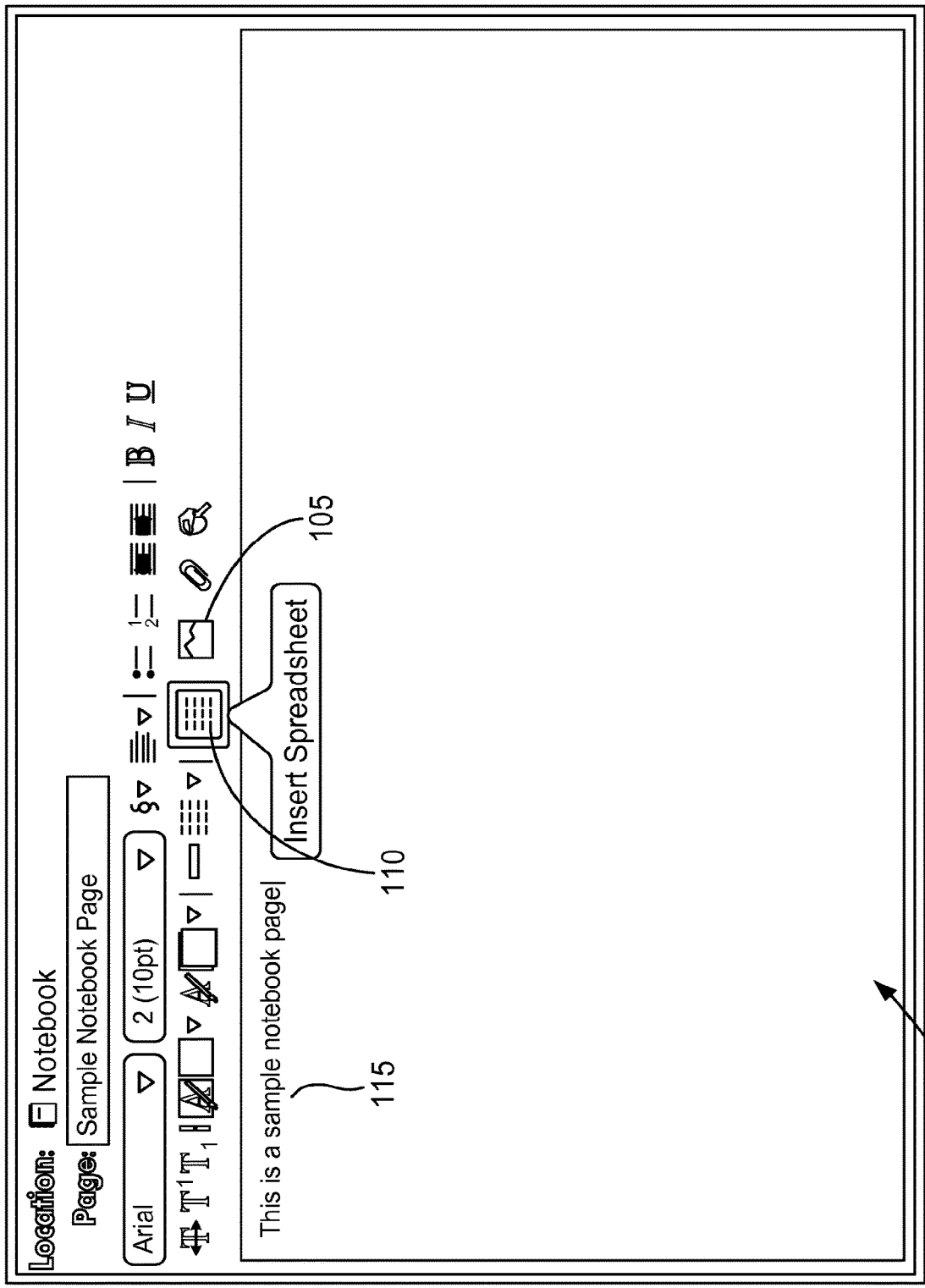
FIG. 1A is a screen shot which shows a notebook page from using the notebook application in the Zimbra Collaboration Suite.

FIG. 1A is a screenshot which shows a notebook page 100 from the Zimbra notebook application (available within the Zimbra Collaboration Suite). Such a notebook page is a container document within which objects can be embedded in accordance with an embodiment of the present invention. Some text content 115 is shown in FIG. 1A. Rich documents can be created in the notebook application. Font, color, size etc. of the text can be customized. Text can be further styled using bullets, numbering, and alignment features. In addition, images can be inserted within the notebook page by clicking on the Insert Image button 105, where images can be imported into the notebook page directly from the user's computer.

In accordance with an embodiment of the present invention, the Insert Spreadsheet button 110 can be used to directly embed a spreadsheet within the notebook page 100. More generally, in accordance with embodiments of the present invention, an Insert Object 110 button can be used to directly embed objects created with different applications (e.g., spreadsheets, calendars and so on) into the notebook page, along with text, images, and so on. It is to be noted that a notebook page is only an example of a container document into which objects can be embedded. Other examples of a container document include an email, a calendar appointment, a memo, and so on. It is also to be noted that embeddable ALE components are not limited to the components found in traditional office applications. For example, AJAX based form components could be used for workflow management within a messaging system.

In accordance with an embodiment of the present invention, multiple objects (using the same of different applications) can be inserted into a single document (e.g., a notebook page).

Figure 1B:
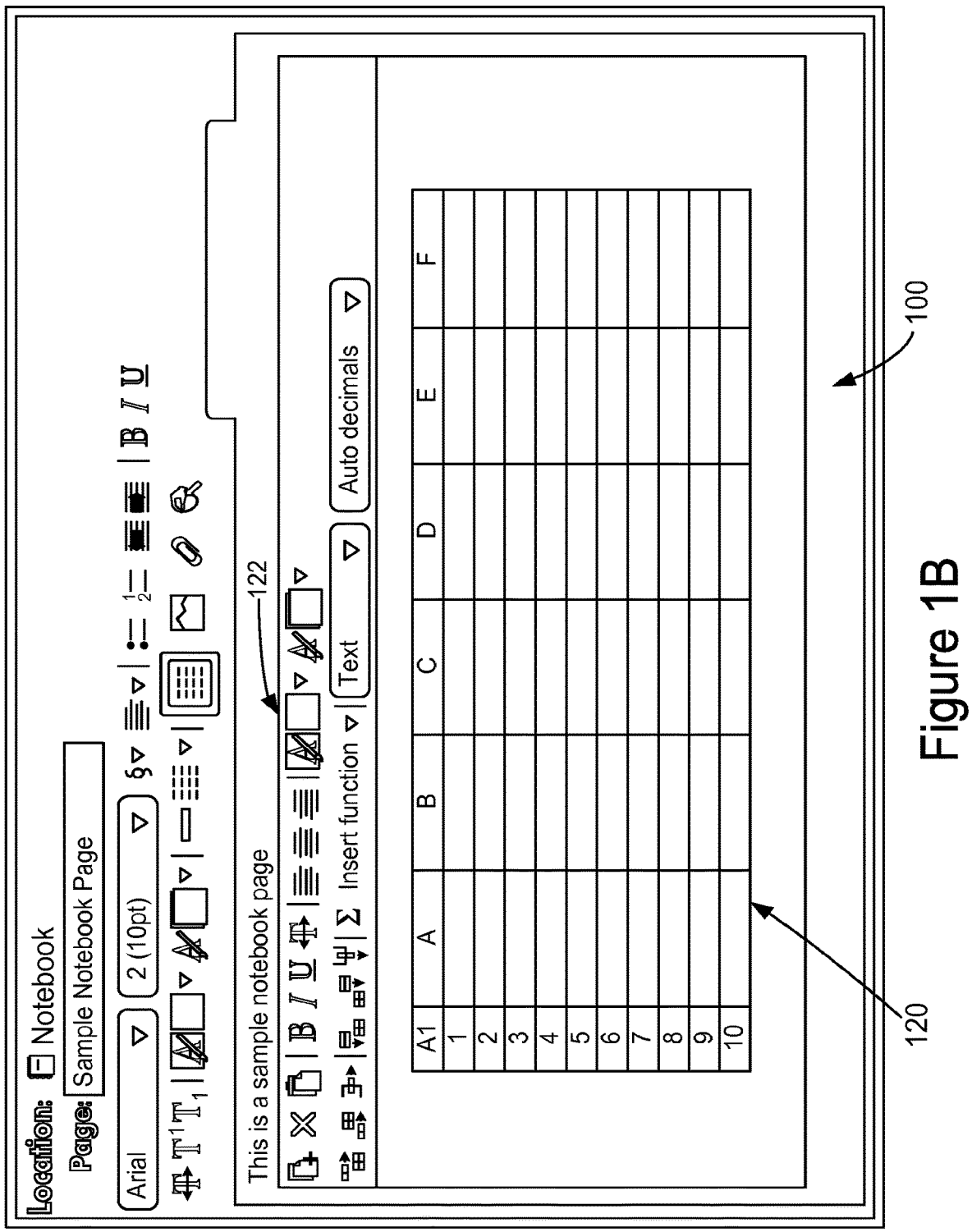
FIG. 1B is a screen shot which shows a new spreadsheet created within the notebook page in accordance with an embodiment of the present invention.
Figure 1C:
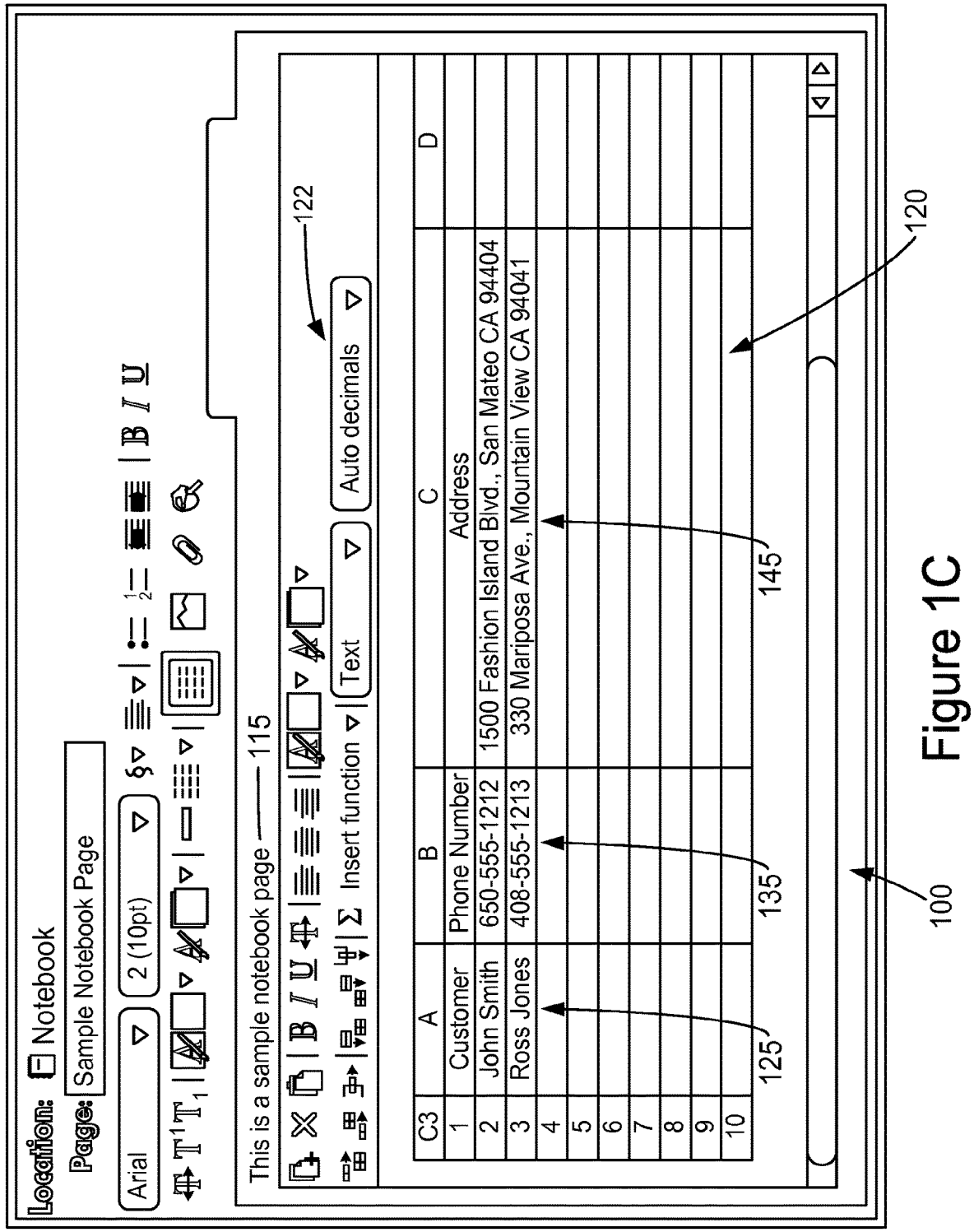
FIG. 1C is a screen shot which shows data being entered into the spreadsheet in accordance with an embodiment of the present invention.

FIG. IB is a screenshot showing a new spreadsheet 120 being created within the notebook page. The method underlying the creation of an embedded object within a container document is discussed in more detail with reference to FIG. 2 below. As shown in FIG. 1B, the spreadsheet is editable, and new data can be directly entered into the spreadsheet. It is also to be noted that functions of the spreadsheet applications, as indicated by buttons 122, are available to the user within the context of the container notebook. FIG. 1C shows some data entered into the spreadsheet 120 within the notebook page 100. Names 125, phone numbers 135, and addresses 145 of customers are shown entered into spreadsheet 120. It is to be noted that the content 115 surrounding the spreadsheet 120 may also be edited by the user. Further, it is to be noted that, in accordance with embodiments of the present invention, several other objects may also be embedded within the same notebook page 100.

In accordance with an embodiment of the present invention, when a "Save" button in the container application (not shown) is pressed, the embedded object becomes read only. FIG. 1D is a screenshot which shows the embedded spreadsheet 120 in read-only mode. It can be seen in FIG. 1D that the various buttons etc. 122 specific to the spreadsheet application that were visible in FIGS. 1B & 1C are no longer visible/available to the user in the read-only mode.

The saved notebook page can be accessed at a later time, and the embedded object can be edited and saved from within the notebook page, in accordance with an embodiment of the present invention. The method underlying the editing of a previously created embedded object within a container document is discussed in more detail with reference to FIG. 3 below. Once a pre-existing (previously created) notebook page is opened, in one embodiment, clicking on an Edit button in the container application (not shown), puts the notebook page, as well as embedded objects (e.g., spreadsheet 110) within it, in edit mode. FIG. 1E shows some data being changed in the previously created spreadsheet 120. Data 125, 135, 145 within the spreadsheet 120 is modified. Text content 115 outside of the spreadsheet 120 is also modified.

It is to be noted that in accordance with an embodiment of the present invention, ALE technology can be used with other technologies. In particular, ALE is compatible with other AJAX technologies. For instance, a cell within an embedded spreadsheet in a notebook page can include Zimlet technology. Zimlet technology is described in co-pending application Ser. No. 11/503,810 entitled "System and Method for Seamlessly Integrating Separate Information Systems within an Application" filed on Aug. 14, 2006, also owned by the assignee of the present invention. This application is hereby incorporated herein in its entirety.

Figure 1F:
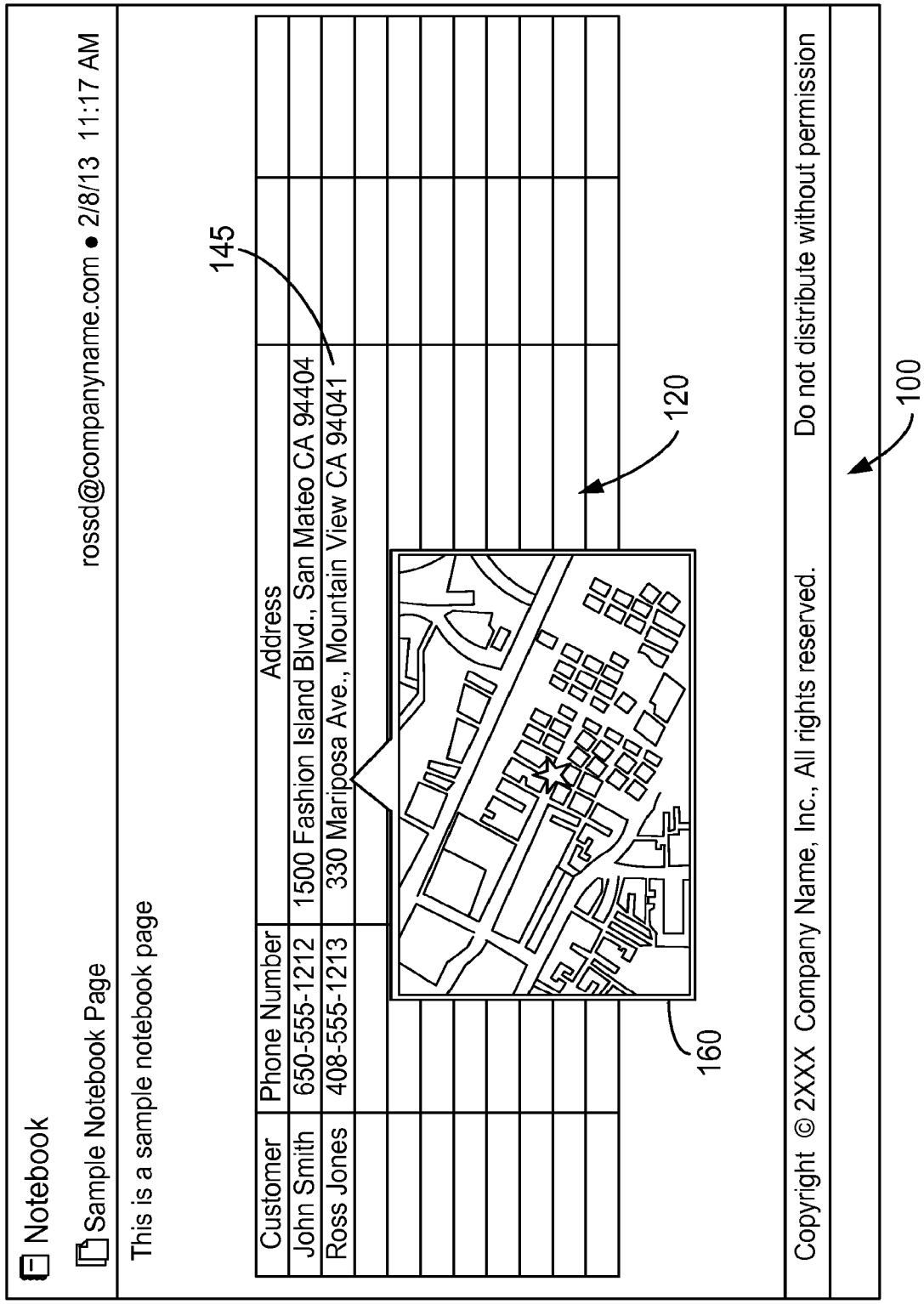
FIG. 1F is a screen shot which shows a map zimlet working with data in a cell in the spreadsheet in accordance with an embodiment of the present invention.

FIGS. 1F-1G show screen shots of examples of zimlet technology implemented on data within the cells of embedded spreadsheet 120. FIG. 1F shows that a map 160 corresponding to an address 145 within a cell of the embedded spreadsheet 120 shows up within a tool-tip (or window) when a user mouse hovers over the address information 145. FIG. 1G shows that a context menu 170 corresponding to a phone number 135 within a cell of the embedded spreadsheet 120 shows up when a user rights clicks on the phone number 135.

EXAMPLE OF FUNCTIONALITY

In one embodiment, ALE leverages two capabilities provided by most modern browsers, such as Firefox from Mozilla (Mountain View, Calif.), Safari from Apple Inc. (Cupertino, Calif.) and Internet Explorer 6.0+ from Microsoft.

(i) The first such capability is "design mode". Design mode enables the browser to become an HTML document editor, making it possible to create and edit HTML documents directly within the browser. This provides the ability to create a "mini-word processor" within the browser. To make a document editable inside a browser, "design mode" needs to be enabled on its document element. This is usually done by the JavaScript code:

document.designMode="on";

(ii) The second capability provided by browsers is the ability to embed one or more Inline Frames (IFrames) within another IFrame. An IFrame is an HTML element which makes it possible to embed another HTML document inside the main document. The size of the IFrame is specified in the surrounding HTML page, so that the surrounding page can already be presented in the browser while the IFrame is still being loaded. IFrames are often used to insert content from another website into a current web-page. Like other HTML elements, IFrames can also be put into design mode.

In accordance with an embodiment of the present invention, !Frames are used to embed components. In such embodiment, when a user inserts an ALE component into a document that the is editing, the ALE framework creates an IFrame into which the ALE component is loaded. The ALE framework then manages the interaction between the outer document, and embedded ALE component, thus providing the object embedding capability of traditional applications to AJAX based applications. This is explained in further detail below with reference to FIG. 2.

Figure 2:
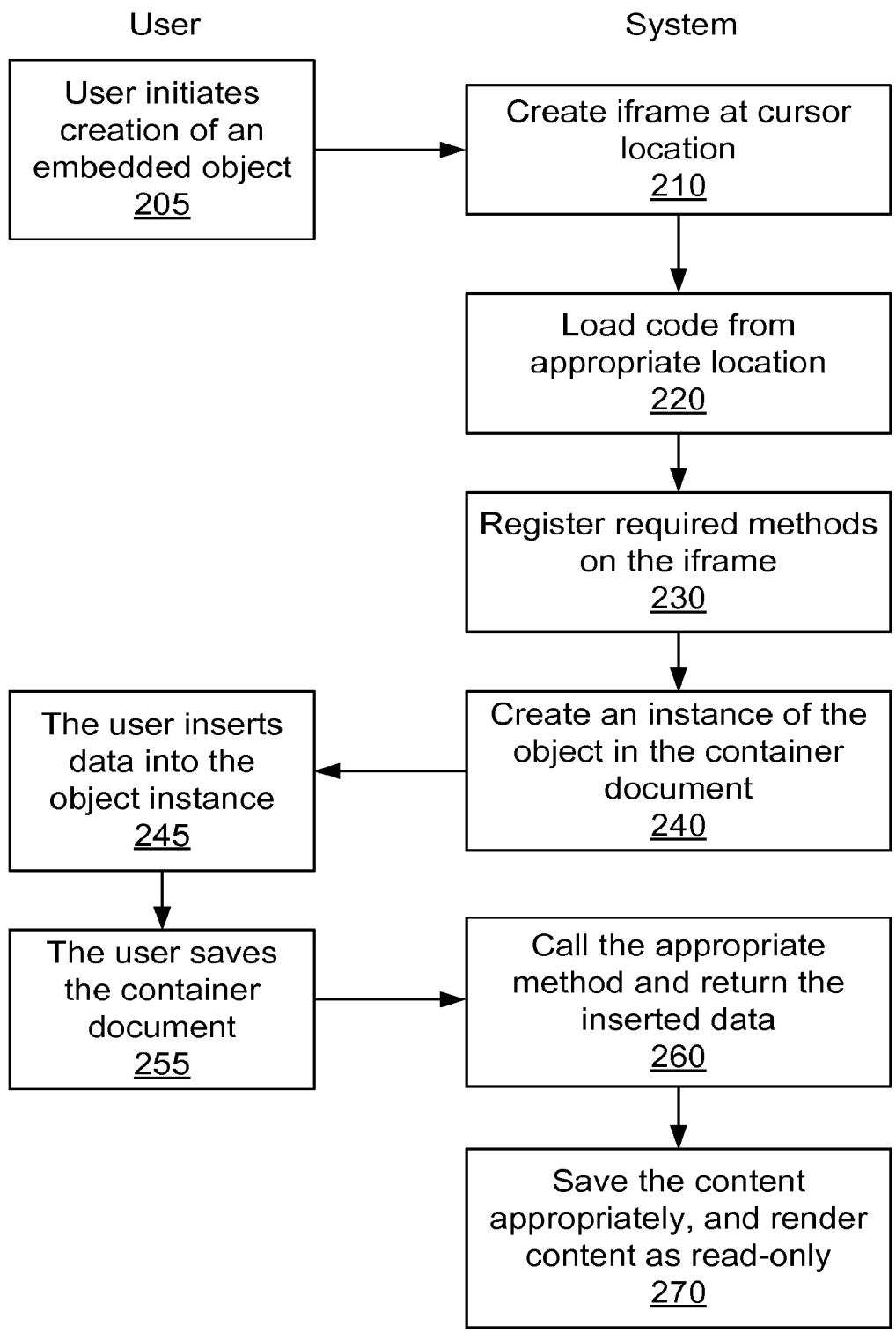
FIG. 2 is a flowchart illustrating the creation of an embedded object within a container document in accordance with an embodiment of the present invention.

FIG. 2 is a flowchart illustrating the creation of an embedded object within a container document in accordance with an embodiment of the present invention. The steps taken by the user, and the steps taken by a system in accordance with the present invention, are both shown in the flowchart.

The user initiates (step 205) the creation of an embedded object in a container document. For instance, the user may initiate (step 205) the creation of an embedded object by clicking on an "insert object" button or by selecting "insert object" from a menu. When the user initiates the creation of an embedded object, in one embodiment, the system creates (step 210) an IFrame at the location in the container document where the user has positioned the cursor. It is to be noted that while an IFrame is used in one embodiment of the present invention, other techniques (such as editing a documents DOM tree, using a <div>, etc.) may be used.

Since, in accordance with an embodiment of the present invention, an ALE compliant component runs in the context of an IFrame element within a document that has been placed into design mode, it essentially runs in a different "context" than the enclosing document (that is it has its own window, document, and JavaScript context). To this end the code and resources for the component are fetched and realized in the IFrame. Code is loaded (step 220) onto the client machine (e.g., the user's computer) from an appropriate location. In one embodiment, the code may be cached by the browser, but it not installed on the client machine like desktop applications. The code to be loaded is specific to the object that the user is attempting to embed into the container document. For instance, if the user is trying to create a spreadsheet in the container document, the code to be loaded may be a JavaScript based spreadsheet application. The appropriate location is specified. In one instance, the location is specified as a Uniform Resource Locator (URL) of the website at which the code is located. (e.g., http://acme.com/spreadsheet.js). In one embodiment, the action of initiating (step 205) the creation of the object triggers the appropriate code being fetched and loaded (step 220) from the appropriate location.

When it is loaded, the code registers (step 230) appropriate methods onto the IFrame. Examples of such methods registered onto the IFrame are serialize and deserialize methods. In one embodiment, the serialize method basically takes the data inserted in the IFrame, and saves it in an appropriate location. In one embodiment, the deserialize method basically returns the data for loading into an instance of the object, when a previously saved object is reopened for editing. The serialize and deserialize methods, as well as some other methods, are discussed in more detail below.

An editable instance of the object (e.g., a spreadsheet) is created (step 240) within the container document. The user then inserts (step 245) data into the object (e.g., spreadsheet). The user then saves (step 255) the container document. This can be done, for instance, by clicking on a "save" button in the container application, and/or by selecting "save" from the menu.

The appropriate registered method is then called (step 260) so that the data inserted by the user is returned. As mentioned above, this method can be the serialize method. The content is then saved appropriately (step 270), and the container document and the embedded document within it are rendered to the user as read-only objects. For instance, in the example of a spreadsheet embedded within a notebook page, the read-only representation can be an HTML representation. In one embodiment, the embedded content is saved (step 270) along with the container document. For instance, a spreadsheet embedded in a notebook page in the Zimbra notebook application is, in one embodiment, saved along with the notebook page. In another embodiment, the embedded object may be saved in a different location from where the container document is saved. In one embodiment, in such a situation, the container document includes a pointer to the location of the saved embedded content.

Figure 3:
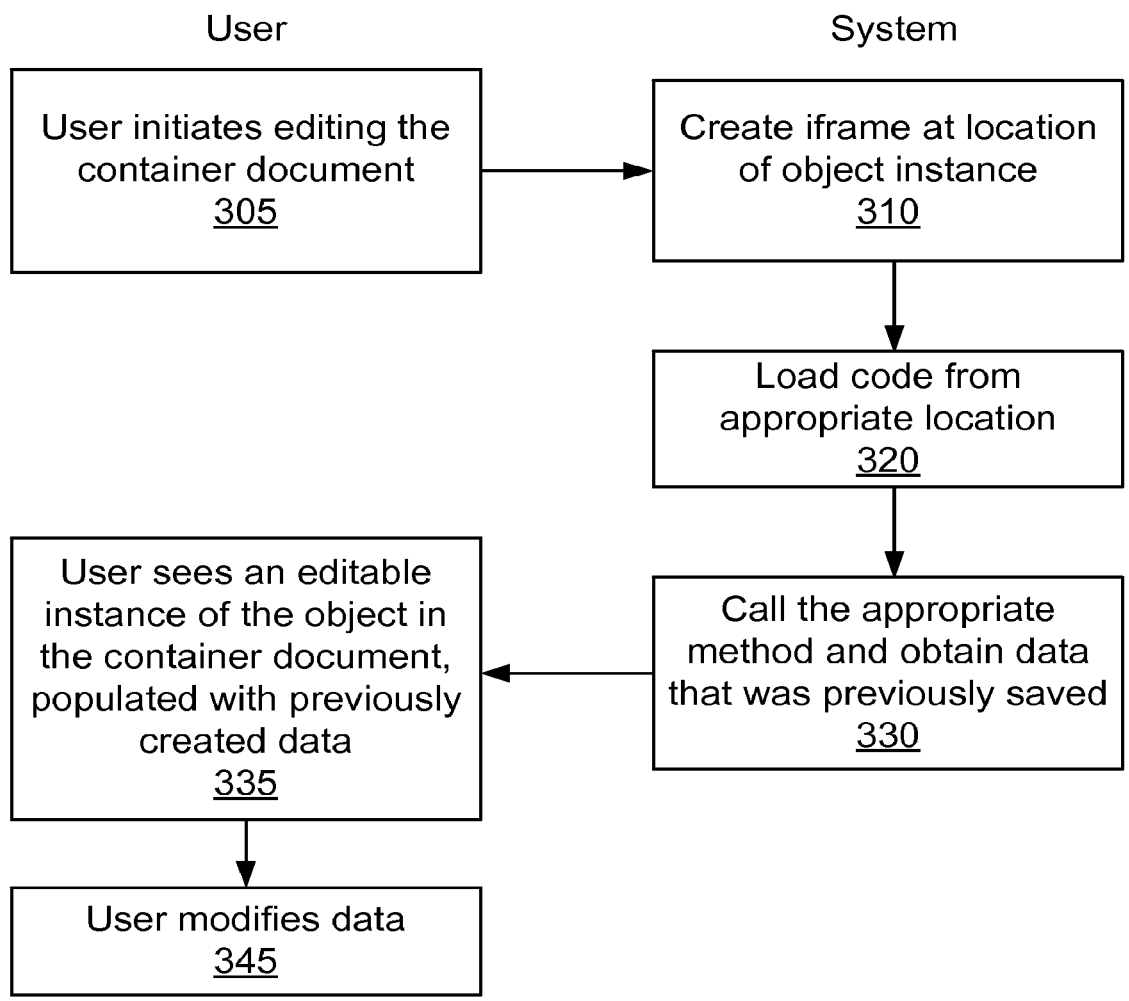
FIG. 3 is a flowchart illustrating the editing of a previously created embedded object within a container document in accordance with an embodiment of the present invention.

A container document containing an embedded object which has been previously created and saved can be accessed and edited by the user. In such a situation, any embedded objects are reconstituted. This is illustrated in FIG. 3. FIG. 3 is a flowchart illustrating the editing of a previously created embedded object within a container document in accordance with an embodiment of the present invention. The steps taken by the user, and the steps taken by a system in accordance with the present invention, are both shown in the flowchart.

A user can open an existing container document and initiate editing (step 305) of the container document. This can be done, for instance, by clicking on an "edit" button in the container application, or by selecting "edit" from a menu. An IFrame is created (step 310) by the system at the appropriate location in the container document. Once again, code is loaded from the appropriate location (step 320) depending on the application which the embedded object is using. In one embodiment, the code has been cached by the browser when the object was created, and does not need to be reloaded at this time. Further, the appropriate method is called (step 330) and the data that was previously saved is returned. As mentioned above, in one embodiment, the deserialize method is used to obtained previously saved data. The user sees (step 335) an editable instance of the object (e.g., spreadsheet) populated with the previously saved data, within the container document (e.g., notebook page). The user then modifies the data (step 345). The user can then save the container document along with the modified data, and this step and the ensuing steps will be as described above with reference to FIG. 2 (Step 255-270).

EXAMPLE OF ALE FRAMEWORK

An ALE framework in accordance with an embodiment of the present invention is described below.

As mentioned above, in accordance with an embodiment of the present invention, an ALE compliant component runs in the context of an IFrame element within a document that has been placed into design mode, it essentially runs in a different "context" than the enclosing document (that is it has its own window, document, and JavaScript context). To this end the code and resources for the component are fetched and realized in the IFrame.

The ALE framework will create the !Frame element and will set its location to a URL that will load the component. The framework will also set the "ALE" variable on the IFrame's window. This way when the component is created, it can check for the existence of this property (simply checking if window.ALE==true). When it detects this, the component does the following:

Treats the IFrame as its "canvas". That is, it creates all HTML elements etc. in the context of the IFrame's document.

Registers certain methods (described below) with the IFRAME's window object.

If the property is present, then the component registers a number of methods on the window object. These methods are described below:

create(serializedContent)—This is called when the window has finished loading. It defines a single formal parameter:
    serializedContent—if there is any data to initialize the component with (as returned by the serialize( ) function below) then it will be passed in this parameter. This function should create the component, and load the given data if serializedContent!=null.

serialize—When invoked this method returns the serialized content of the ALE component. This content is a JavaScript String.

deserialize—When called with the data returned from the serialize method, this method deserializes the content and render it in the ALE compliant component. This method defines a single formal parameter:
  serializedContent—Content returned from a call to the serialize method
getHTML( )—When called, this method returns an HTML representation of the ALE component's content at the time the method is being called. This is useful when desiring to provide a read-only representation of the object's content without having to instantiate the actual component.
getHeadHTML( )—This method is optional. It allows components to insert some HTML in the <head> section of the document. This is useful for components that need to define some <style> properties. In accordance with an embodiment of the present invention, this method is called only once per component type.
setEditable( )—This method is used to set the editable state of the component. It defines a single formal parameter:
  editable—if set to true, then the component is editable, if set to false, then the component is read only.

The ALE framework invokes the above methods during the component lifecycle. For example:

When the user elects to insert a component into an editable document, the ALE framework inserts an IFrame at the appropriate location in the document and set the location of the IFrame to the URL at which the component is rooted. After the content is fully loaded, it will set the "ALE" variable on the IFrame's window and call the create( ) function.

When the user elects to save the document, the ALE framework calls the serialize( ) method to get the serialized content of the component so that it may be saved. The framework also calls getHTML( ) and saves this content along with the document. This is useful for rendering a read-only view of the document that can be displayed by clients that are not ALE-enabled.

When the document is re-edited at a later date, the ALE framework will instantiate each ALE component calling create(savedData) method to set the component's state to that of the last saved edit.

EXAMPLE OF SYSTEM

Figure 4:
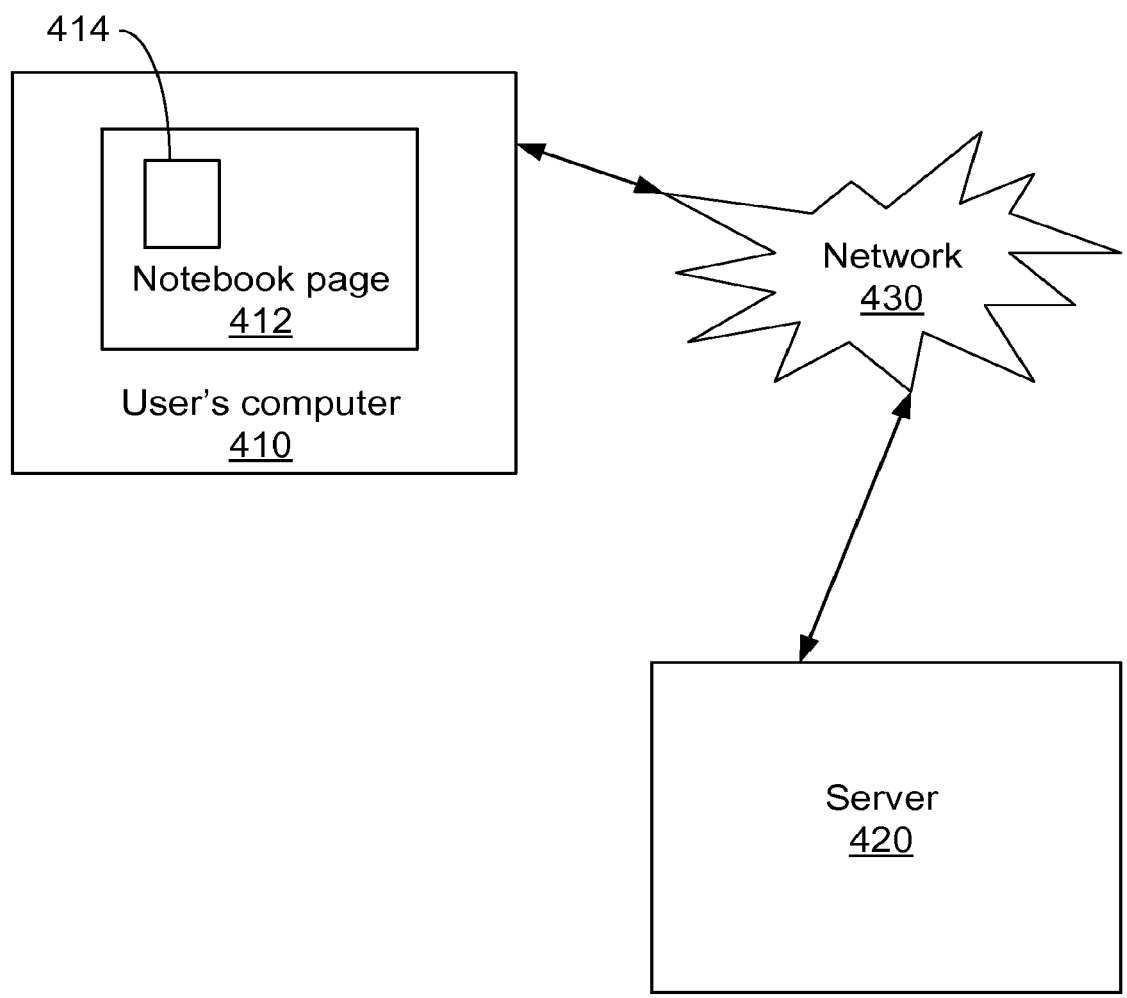
FIG. 4 is a block diagram of a system in accordance with and embodiment of the present invention

FIG. 4 is a block diagram of a system in accordance with and embodiment of the present invention. A user's computer 410 can communicate with a server 420 through a network 430.

In one embodiment, the user's computer 410 is a conventional computer system, that may include a CPU, a storage device, a network services connection 430, and conventional input/output devices such as, a display, a mouse, a printer, and/or a keyboard, that may couple to a computer system. The computer also includes a conventional operating system, an input/output device, and network services software. Several of these components are not shown in FIG. 4 for purposes of clarity. The computer, the storage device, and the network services connection, may be available from, for example, IBM Corporation (Armonk, N.Y.), Sun Microsystems, Inc. (Palo Alto, Calif.), Hewlett-Packard, Inc. (Palo Alto, Calif.), or Apple (Cupertino, Calif.). In one embodiment, the user's host computer 410 can be a Personal Digital Assistant (PDA), a cell phone, or any device with the appropriate computing abilities.

A display associated with the user's computer 410 shows a notebook page 412, with an embedded object 414. In one embodiment, the notebook application is part of a collaboration suite client application. Such a collaboration suite client application may include an email application, a contacts application, and a calendar application, and so on. The collaboration suite client application may also include other modules such as a to-do list application, a memo application, and so on. Outlook from Microsoft Corp. (Redmond, Wash.), Zimbra Collaboration Suite from Zimbra, Inc. (San Mateo Calif.), and Lotus Notes from IBM (Armonk, N.Y.) are examples of Collaboration Suite Clients.

The network 430 can be any network, such as a Wide Area Network (WAN) or a Local Area Network (LAN), a home network, or any other network. Such a network may be wired, wireless, or any combination of these. A WAN may include the Internet, the nternet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or Windows NT from Microsoft Corporation (Redmond, Wash.). The network 1130 may also include commercially available subscription-based services such as, for example, AOL from America Online, Inc. (Dulles, Va.) or MSN from Microsoft Corporation (Redmond, Wash.).

The user's computer 410 can communicate with server 420 through network 430. In one embodiment, the server 420 is a collaboration suite server.

In one embodiment, the code for the application used by the embedded object 414 is on the server 420. In another embodiment, this code is on another server (not shown) with which the user's computer 410 can communicate, over network 430 (or other similar networks). When the user saves the notebook page 412 along with embedded content 414, in one embodiment, the notebook page 412 and the embedded content 414 are saved on the server 420.

It is to be noted that the present invention is in no way limited to the system described, and that the systems discussed above are simply examples of systems that can implement embodiments of the present invention. For instance, while FIG. 4 illustrates a system implemented as a client-server architecture, other architectures (e.g., a purely client based architecture) may also be used. In one system which can implement embodiments of the present invention, the client is actually downloaded into the browser, i.e. it is not typically installed on the user's computer at all.

While particular embodiments and applications of the present invention have been illustrated and described, it is to be understood that the invention is not limited to the precise construction and components disclosed herein. For example, the present invention includes embodiments of other systems and methods where the application code is fetched over a network and runs within the context of an application, but is transient in nature and can be run from any location, and where the data created with that application is saved with the containing document. Further, other languages and/or protocols may be used to implement a system and method in accordance with the present invention. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. A method comprising:
  receiving, at a client machine, a user input requesting creation of an embedded object at a location in a container document provided in a browser window of the client machine, wherein the container document uses a first application and the object uses a second application that is not supported by an underlying application on the client machine, and in response to the user input:

generating a region at the location in the container document that executes in a different context than the container document;

loading code specific to the second application used by the object to be embedded in the container document onto the client machine, the code received from a remote server hosting the second application, wherein the code is specific to the object to be embedded in the container document, and wherein the code is loaded without installing the second application associated with the code and executing on the remote server;

using the loaded code to register one or more methods into the generated region at the location in the container document for remotely accessing data inserted into the embedded object including a serialize method that retrieves and saves data inserted into the embedded object to the remote server and a deserialize method that retrieves previously saved data from the remote server hosting the second application and loads the previously saved data into the embedded object for editing; and creating an editable instance of the embedded object at the location within the container document in the browser window using the loaded code;

receiving user input inserting data into the embedded object; and saving the container document to a location associated with the remote server such that the data inserted to the embedded object is available for instantiation from different client machines, and in response to saving, rendering the embedded object in the container document as read-only.

2. The method of claim 1, wherein saving the data of the embedded object comprises invoking a serialize method of the loaded code to save the data in an appropriate location.

3. The method of claim 2, further comprising:
receiving a request to edit the embedded object;
loading the code and invoking a deserialize method of the code to obtain the saved data; and
creating a second instance of the embedded object within the container document including loading the saved data into the second instance.

4. The method of claim 3, wherein loading the code includes retrieving the code from a cache of the client machine.

5. The method of claim 1, wherein generating the region comprises creating an Iframe at the location and wherein the loaded code is realized within the Iframe.

6. The method of claim 1, wherein saving the container document includes calling the serialize method to return the data input to the object at a specified location and then rendering the container document and the embedded object as read-only objects.

7. A system comprising:
one or more computing devices including one or more processors and one or more memory devices storing instructions executed by the one or more processors to execute computing operations comprising:
receiving, at a client machine, a user input requesting creation of an embedded object at a location in a container document provided in a browser window of the client machine, wherein the container document uses a first application and the object uses a second application that is not supported by an underlying application on the client machine, and in response to the user input:

generating a region at the location in the container document that executes in a different context than the container document;

loading code specific to the second application used by the object to be embedded in the container document onto the client machine, the code received from a remote server hosting the second application, wherein the code is specific to the object to be embedded in the container document, and wherein the code is loaded without installing the second application associated with the code and executing on the remote server;

using the loaded code to register one or more methods into the generated region at the location in the container document for remotely accessing data inserted into the embedded object including a serialize method that retrieves and saves data inserted into the embedded object to the remote server and a deserialize method that retrieves previously saved data from the remote server hosting the second application and loads the previously saved data into the embedded object for editing; and creating an editable instance of the embedded object at the location within the container document in the browser window using the loaded code;

receiving user input inserting data into the embedded object; and saving the container document to a location associated with the remote server such that the data inserted to the embedded object is available for instantiation from different client machines, and in response to saving, rendering the embedded object in the container document as read-only.

8. The system of claim 7, wherein saving the data of the embedded object comprises invoking a serialize method of the loaded code to save the data in an appropriate location.

9. The system of claim 8, further including instructions to execute computing operations comprising:
receiving a request to edit the embedded object;
loading the code and invoking a deserialize method of the code to obtain the saved data; and
creating a second instance of the embedded object within the container document including loading the saved data into the second instance.

10. The system of claim 9, wherein loading the code includes retrieving the code from a cache of the client machine.

11. The system of claim 7, wherein generating the region comprises creating an Iframe at the location and wherein the loaded code is realized within the Iframe.

12. The system of claim 7, wherein saving the container document includes calling the serialize method that is used to save data input to the object at a specified location and then rendering the container document and the embedded object as read-only objects.

13. One or more non-transitory computer readable storage media storing instructions that when executed by one or more processors are configured to perform operations comprising:
receiving, at a client machine, a user input requesting creation of an embedded object at a location in a container document provided in a browser window of the client machine, wherein the container document uses a first application and the object uses a second application that is not supported by an underlying application on the client machine, and in response to the user input:

generating a region at the location in the container document that executes in a different context than the container document;

loading code specific to the second application used by the object to be embedded in the container document onto the client machine, the code received from a remote server hosting the second application, wherein the code is specific to the object to be embedded in the container document, and wherein the code is loaded without installing the second application associated with the code and executing on the remote server;

using the loaded code to register one or more methods into the generated region at the location in the container document for remotely accessing data inserted into the embedded object including a serialize method that retrieves and saves data inserted into the embedded object to the remote server and a deserialize method that retrieves previously saved data from the remote server hosting the second application and loads the previously saved data into the embedded object for editing; and creating an editable instance of the embedded object at the location within the container document in the browser window using the loaded code;

receiving user input inserting data into the embedded object; and saving the container document to a location associated with the remote server such that the data inserted to the embedded object is available for instantiation from different client machines, and in response to saving, rendering the embedded object in the container document as read-only.

14. The one or more non-transitory computer readable storage media of claim 13, wherein saving the data of the embedded object comprises invoking a serialize method of the loaded code to save the data in an appropriate location.

15. The one or more non-transitory computer readable storage media of claim 14, wherein the instructions executed by the one or more processors are further configured to perform operations comprising:

receiving a request to edit the embedded object;

loading the code and invoking a deserialize method of the code to obtain the saved data; and creating a second instance of the embedded object within the container document including loading the saved data into the second instance.

16. The one or more non-transitory computer readable storage media of claim 3, wherein loading the code includes retrieving the code from a cache of the client machine.

17. The one or more non-transitory computer readable storage media of claim 1, wherein generating the region comprises creating an Iframe at the location and wherein the loaded code is realized within the Iframe.

18. The one or more non-transitory computer readable storage media of claim 1, wherein saving the container document includes calling the serialize method that is used to save data input to the object at a specified location and then rendering the container document and the embedded object as read-only objects.

* * * * *